(12) United States Patent
Ye

(10) Patent No.: US 11,579,735 B2
(45) Date of Patent: Feb. 14, 2023

(54) TOUCH ELECTRODE LAYER AND TOUCH DISPLAY DEVICE

(71) Applicant: Wuhan China Star Optoelectronics Semiconductor Display Technology Co., Ltd., Wuhan (CN)

(72) Inventor: Jian Ye, Wuhan (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 0 days.

(21) Appl. No.: 16/763,330

(22) PCT Filed: Dec. 23, 2019

(86) PCT No.: PCT/CN2019/127323
§ 371 (c)(1),
(2) Date: May 12, 2020

(87) PCT Pub. No.: WO2021/056877
PCT Pub. Date: Apr. 1, 2021

(65) Prior Publication Data
US 2022/0214768 A1    Jul. 7, 2022

(30) Foreign Application Priority Data

Sep. 26, 2019    (CN) .......................... 201910915878.0

(51) Int. Cl.
*G06F 3/044* (2006.01)
*G06F 3/041* (2006.01)
(52) U.S. Cl.
CPC .......... *G06F 3/0446* (2019.05); *G06F 3/0412* (2013.01); *G06F 3/0443* (2019.05);
(Continued)

(58) Field of Classification Search
CPC .... G06F 3/0448; G06F 3/0412; G06F 3/0443; G06F 3/0445; G06F 3/0446; G06F 2203/04111
See application file for complete search history.

(56) References Cited

U.S. PATENT DOCUMENTS

2014/0054156 A1    2/2014 Chang et al.
2014/0152921 A1    6/2014 Yashiro et al.
(Continued)

FOREIGN PATENT DOCUMENTS

CN    104077002 A    10/2014
CN    104123054 A    10/2014
(Continued)

*Primary Examiner* — Deeprose Subedi
(74) *Attorney, Agent, or Firm* — Nathan & Associates; Menachem Nathan

(57) ABSTRACT

The invention provides a touch electrode layer and a touch display device, including a first electrode and a second electrode. The first electrode has a first electrode stem and a plurality of first electrode branches arranged obliquely along the first electrode stem. The second electrode has a second electrode stem and a plurality of second electrode branches arranged obliquely along the second electrode stem. The first electrode and the second electrode are arranged in a symmetrical structure, and inclination angles of the first electrode branches and the second electrode branches are same. In a touch electrode unit, shape and size of the first electrode and the second electrode are almost same, and shape and size of the first electrode branches and the second electrode branches that are staggered are also almost the same.

19 Claims, 6 Drawing Sheets

(52) U.S. Cl.
CPC .......... *G06F 3/0445* (2019.05); *G06F 3/0448* (2019.05); *G06F 2203/04111* (2013.01)

(56) References Cited

U.S. PATENT DOCUMENTS

2014/0198268 A1    7/2014  Sugita et al.
2014/0347299 A1   11/2014  Lu et al.
2018/0224968 A1*  8/2018  Church ................ G06F 3/0448

FOREIGN PATENT DOCUMENTS

| CN | 104182081 A | 12/2014 |
| --- | --- | --- |
| CN | 104793833 A | 7/2015 |
| CN | 204790951 U | 11/2015 |
| CN | 107831960 A | 3/2018 |
| CN | 108182008 A | 6/2018 |
| CN | 108491114 A | 9/2018 |

* cited by examiner

TOUCH ELECTRODE LAYER AND TOUCH DISPLAY DEVICE

CROSS REFERENCE TO RELATED APPLICATIONS

The present application claims priority of a Chinese patent application filed on Sep. 26, 2019 with the National Intellectual Property Administration, application number 201910915878.0, titled "Touch electrode layer and touch display device", which is incorporated by reference in the present application in its entirety.

FIELD OF INVENTION

The invention relates to the field of touch display, in particular to a touch electrode layer and a touch display device.

BACKGROUND OF INVENTION

Capacitive touch screens are widely used in various electronic interactive scene devices due to their high durability, long life, and support for multi-touch functions. The capacitive touch screens detect a specific position touched by a finger by detecting a change in capacitance at the position touched by the finger. Therefore, when an amount of change in capacitance caused by a touch is small, conventional capacitive touch screens may not be able to accurately detect whether there is a touch input or not.

Technical Problem

Since structural design of the touch screens is a very important factor in detecting the change in capacitance, it is necessary to develop a touch screen design that can detect a small change in capacitance. At present, for active-matrix organic light-emitting diode (AMOLED) display screens, touch electrode patterns usually need to be directly fabricated on an upper surface of a thin film encapsulation layer. However, due to a thickness of the encapsulation layer being thinner (generally less than 10 um), a distance between a touch electrode and a cathode is small, which results in a large parasitic capacitance between a driving electrode (TX) and/or a sensing electrode (RX) and the cathode, which causes a large RC delay and reduces control sensitivity. Moreover, in current flexible AMOLED display screens, material of the touch electrode is usually a hollow metal grid. Its actual effective conductive electrode area is relatively smaller than that of a traditional touch electrode having full-surface transparent indium tin oxide (ITO). Therefore, a mutual induction capacitance between the touch electrodes TX and RX is very small, which results in a smaller capacitance change caused by a touch, which is not easily detected by a touch chip.

Therefore, it is urgent to provide a new touch electrode layer and a touch display device to improve resolution and accuracy of touch position detection of the touch display devices.

SUMMARY OF INVENTION

Technical Solutions

An object of the present invention is to provide a touch electrode layer and a touch display device. It can effectively improve a mutual capacitance value between a touch drive electrode and a touch sensing electrode, also to make the distribution of a mutual capacitance electric field in an entire touch screen structure more uniform, which is more conducive to improve resolution and accuracy of a touch position detection.

In order to achieve the above object, the present invention provides a touch electrode layer including a plurality of first electrode chains disposed along a first direction, each of the first electrode chains including a plurality of first electrodes electrically connected to each other; and a plurality of second electrode chains disposed along a second direction, each of the second electrode chains including a plurality of second electrodes electrically connected to each other, and each of the first electrode chains and each of the second electrode chains insulated from each other; wherein each of the first electrodes intersects with one of the second electrodes corresponding to the first electrode to form a touch electrode unit, each of the first electrodes includes a first electrode stem and a plurality of first electrode branches, each of the first electrode branches is obliquely connected to the first electrode stem; and each of the second electrodes includes a second electrode stem and a plurality of second electrode branches, each of the second electrode branches is obliquely connected to the second electrode stem, each of the first electrode branches and each of the second electrode branches are staggered and insulated from each other, and each of the first electrode branches is arranged in a gap between two adjacent second electrode branches.

Furthermore, the touch electrode layer further including a third electrode insulated from the first electrodes and the second electrodes, and disposed between the first electrode branches and the second electrode branches.

Furthermore, the first electrode stem includes a first longitudinal electrode stem and two first lateral electrode stems respectively positioned at two ends of the first longitudinal electrode stem, the first longitudinal electrode stem is vertically connected to the two first lateral electrode stems, and the first electrode branches are all obliquely connected to the first longitudinal electrode stem or the first lateral electrode stems.

Furthermore, the second electrode stem includes a second lateral electrode stem and two second longitudinal electrode stems respectively positioned at two ends of the second lateral electrode stem, the second lateral electrode stem is vertically connected to the two second longitudinal electrode stems, and the second electrode branches are all obliquely connected to the second longitudinal electrode stems or the second lateral electrode stem.

Furthermore, the first longitudinal electrode stem intersects with the second lateral electrode stem to form a crossing region, and each of the first electrodes and each of the second electrodes are insulated from each other in the crossing region.

Furthermore, the first longitudinal electrode stem includes an upper electrode stem, a lower electrode stem, and a first connection portion connecting the upper electrode stem and the lower electrode stem; the upper electrode stem is up-down symmetrical with the lower electrode stem; and a part of the first electrode branches is connected to each other through the upper electrode stem and one of the first lateral electrode stems, and the other part of the first electrode branches is connected to each other through the lower electrode stem and another one of the first lateral electrode stems.

Furthermore, a plurality of first intermediate portions are disposed between the first electrode branches and the first electrode stem; and a plurality of second intermediate portions are disposed between the second electrode branches and the second electrode stem.

Furthermore, a shape of each of the first intermediate portions and the second intermediate portions includes a triangle or a trapezoid.

Furthermore, the second lateral electrode stem includes a left electrode stem, a right electrode stem, and a second connection portion connecting the left electrode stem and the right electrode stem; the left electrode stem is bilaterally symmetrical with the right electrode stem; a part of the second electrode branches is connected to each other through the left electrode stem and one of the second longitudinal electrode stems, and the other part of the second electrode branches is connected to each other through the right electrode stem and the other second lateral electrode stem.

Furthermore, the touch electrode layer further including a buffer layer; an insulating layer disposed on the buffer layer; a first metal layer disposed in the insulating layer, wherein the first electrode chains are formed in the first metal layer; and a second metal layer disposed on the insulating layer, wherein the second electrode chains are formed in the second metal layer.

Furthermore, the touch electrode layer further including a buffer layer; an insulating layer disposed on the buffer layer and including a connection bridge corresponding to the crossing region; a first metal layer disposed on the insulating layer, wherein the first electrode chains are formed in the first metal layer; and a second metal layer disposed on the insulating layer and on a same layer as the first metal layer, wherein the second electrode chains are formed in the second metal layer, the first connection portion is the connection bridge in the crossing region, and the upper electrode stem and the lower electrode stem are electrically connected through the connection bridge.

Furthermore, the touch electrode unit includes a first center line defined along the first direction and a second center line defined along the second direction; the first electrode stem is bilaterally symmetric with respect to the first center line, and is up-down symmetric with respect to the second center line; and the second electrode stem is bilaterally symmetric with respect to the first center line, and is up-down symmetric with respect to the second center line.

Furthermore, an inclination angle of the first electrode branches is same as an inclination angle of the second electrode branches.

Furthermore, a third electrode is disposed between the first electrode and the second electrode, the third electrode is up-down symmetrical and has disconnected upper and lower two parts, and the third electrode is insulated from the first electrode and the second electrode.

Furthermore, each of the first electrode branches includes at least one electrode protrusion, the at least one electrode protrusion is perpendicular to the each of the first electrode branches; each of the second electrode branches includes at least one recess, and the at least one electrode protrusion is clamped in the at least one recess.

The invention also provides a touch display device including a substrate; a thin film transistor layer disposed on the substrate; a display layer disposed on the thin film transistor layer; the touch electrode layer described above, wherein the touch electrode layer is disposed on the display layer and connected to an integrated chip through a plurality of wires.

Furthermore, a thin film encapsulation layer is further disposed between the display layer and the touch electrode layer.

Beneficial Effect

The invention provides a touch electrode layer and a touch display device. The touch electrode layer has a first electrode and a second electrode. The first electrode has a first electrode stem and a plurality of first electrode branches arranged obliquely along the first electrode stem. The second electrode has a second electrode stem and a plurality of second electrode branches arranged obliquely along the second electrode stem. The first electrode and the second electrode are arranged in a symmetrical structure, and inclination angles of the first electrode branches and the second electrode branches are same. In a touch electrode unit, the shape and size of the first electrode and the second electrode are almost same, and the shape and size of the first electrode branches and the second electrode branches that are staggered are also almost the same. This can effectively improve a mutual capacitance value between a touch driving electrode and a touch sensing electrode, as well as make the distribution of a mutual capacitance electric field in an entire touch screen structure more uniform, which is more conducive to improve resolution and accuracy of a touch position detection.

BRIEF DESCRIPTION OF FIGURES

In order to illustrate the technical solutions of the present embodiment or the related art in a clearer manner, the drawings desired for the present embodiment or the related art will be described hereinafter briefly. Obviously, the following drawings merely relate to some embodiments of the present disclosure, and based on these drawings, a person skilled in the art may obtain the other drawings without any creative effort.

Figure 1:
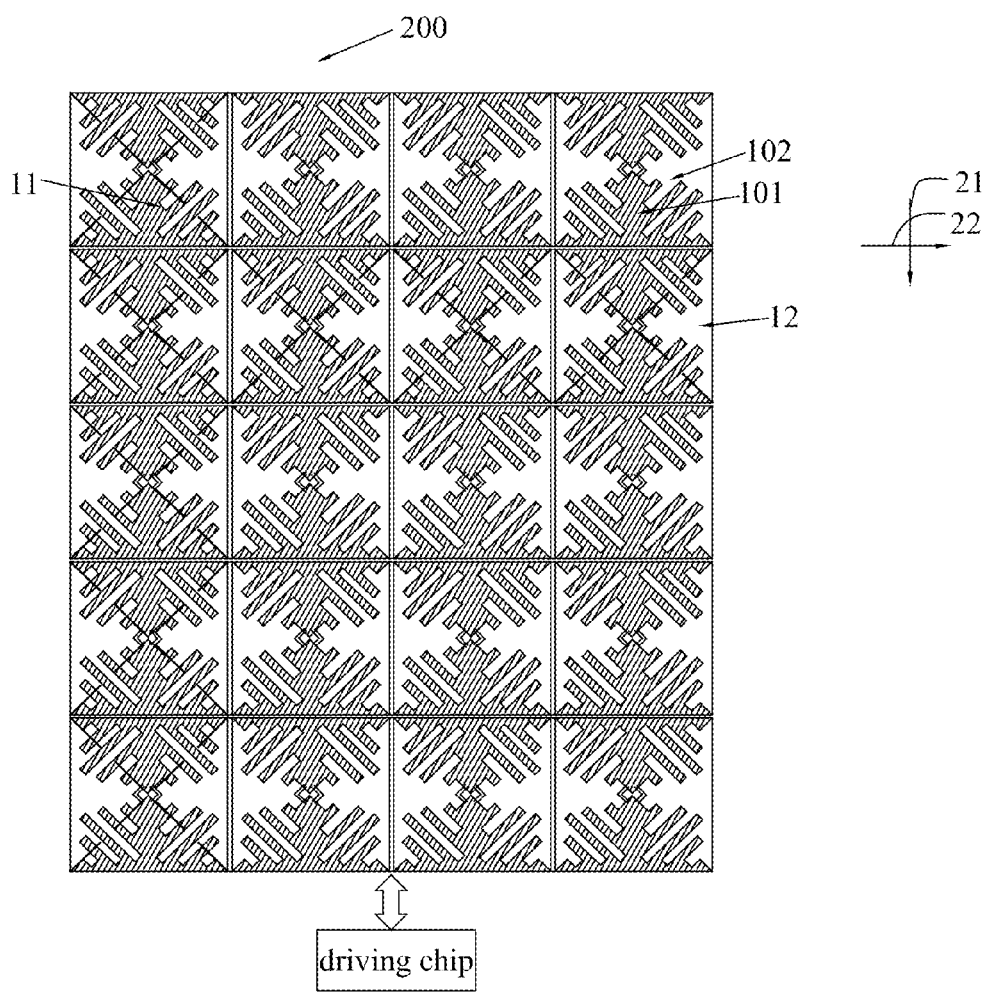
FIG. 1 is a schematic plane view of a touch electrode layer according to a first embodiment of the present invention.

The component reference numbers in the figures are as follows:

touch electrode unit 100; first center line 110; second center line 120;

first electrode 101; second electrode 102; first longitudinal electrode stem 1011;

first lateral electrode stem 1012; first electrode branch 1013; upper electrode stem 1011*a*;

lower electrode stem 1011*b*; first connection portion 104; second longitudinal electrode stem 1021;

second lateral electrode stem 1022; second electrode branch 1023; left electrode stem 1022*a*;

right electrode stem 1022*b*; second connection portion 105; first electrode stem 10;

second electrode stem 20; touch electrode layer 200; buffer layer 201;

insulating layer 202; touch display device 300; encapsulation layer 304;

polarizer 305; glass cover 306; substrate 301;

thin film transistor layer 302; display layer 303;

encapsulation layer 305; first electrode stem 10; second electrode stem 20;

first electrode chain 11; and second electrode chain 12.

DETAILED DESCRIPTION OF EMBODIMENTS

The following embodiments are referring to the accompanying drawings for exemplifying specific implementable embodiments of the present invention.

Embodiments of the present invention will be described in detail herein with reference to the drawings. The invention may take many different forms, and the invention should not be construed as merely the specific embodiments set forth herein. The embodiments of the present invention are provided to explain the practical application of the present invention, so that those skilled in the art can understand various embodiments of the present invention and various modifications suitable for a specific intended application.

First Embodiment

Shown in FIG. 1 is a touch electrode layer 200 according to a first embodiment of the present invention. In the first embodiment, the touch electrode layer 200 includes a plurality of first electrode chains 11 disposed along a first direction 21. Each of the first electrode chains includes a plurality of first electrodes 101 electrically connected to each other. A plurality of second electrode chains 12 are disposed along a second direction 22. Each of the second electrode chains includes a plurality of second electrodes 102 electrically connected to each other, and each of the first electrode chains 11 and each of the second electrode chains 12 are insulated from each other. The first direction 21 is perpendicular to the second direction 22. The first electrode chain 11 is labeled with a vertical diamond-shaped dotted frame shown in FIG. 1, and the second electrode chain 12 is labeled with a horizontal diamond-shaped dotted frame shown in FIG. 1.

Each of the first electrodes 101 intersects with one of the second electrodes 102 corresponding to the first electrode to form a touch electrode unit 100. In other words, the touch electrode units 100 are distributed in an array on an insulating layer 202, and the touch electrode units 100 are connected to a driving chip through a plurality of wires.

Figure 2:
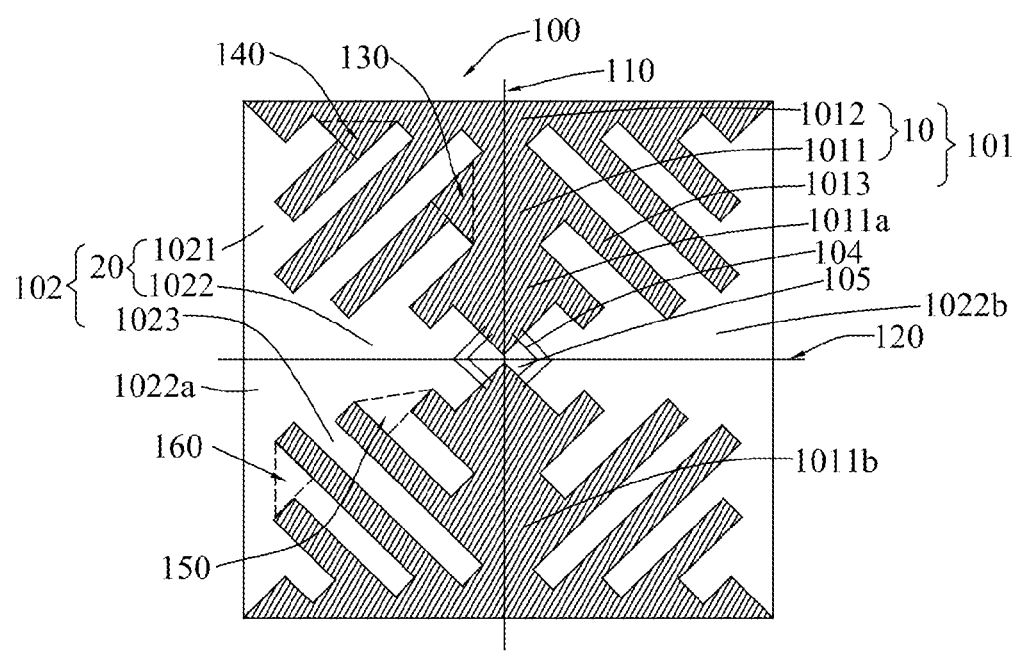
FIG. 2 is a schematic diagram of a planar layout of the touch electrode layer according to the first embodiment of the present invention.

As shown in FIG. 2, each of the first electrodes 101 includes a first electrode stem 10 and a plurality of first electrode branches 1013. Each of the first electrode branches 1013 is obliquely connected to the first electrode stem 10.

Each of the second electrodes 102 includes a second electrode stem 20 and a plurality of second electrode branches 1023. Each of the second electrode branches 1023 is obliquely connected to the second electrode stem 20. Each of the first electrode branches 1013 and each of the second electrode branches 1023 are staggered and insulated from each other. Each of the first electrode branches 1013 is arranged in a gap between two adjacent second electrode branches 1023.

The first electrode 101 is a driving electrode, as shown in the light-colored region in the figure; the second electrode 102 is a sensing electrode, as shown in the dark-colored region in the figure.

Material of the first electrode 101 and the second electrode 102 can be full-surface indium tin oxide; it can also be a hollow metal grid structure as in the present embodiment, and the material can be Ti, Al, Mo, Ag, Cu, and other metal materials, or alloys of the above-mentioned several metal materials.

The first electrode stem 10 includes a first longitudinal electrode stem 1011 and two first lateral electrode stems 1012 respectively positioned at two ends (ie, upper and lower ends) of the first longitudinal electrode stem 1011.

The first longitudinal electrode stem 1011 is vertically connected to the two first lateral electrode stems 1012, and the first longitudinal electrode stem 1011 is bilaterally symmetrical. As shown in FIG. 1, the first longitudinal electrode stem 1011 is disposed along a first center line 110 and is bilaterally symmetric with respect to the first center line 110.

The first longitudinal electrode stem 1011 includes an upper electrode stem 1011a, a lower electrode stem 1011b, and a first connection portion 104. The first connection portion 104 connects the upper electrode stem 1011a and the lower electrode stem 1011b.

The upper electrode stem 1011a and the lower electrode stem 1011b are up-down symmetrical. Specifically, as shown in FIG. 1, the upper electrode stem 1011a and the lower electrode stem 1011b are up-down symmetric with respect to a second center line 120, and the second center line 120 is perpendicular to the first center line 110.

The two first lateral electrode stems 1012 are up-down symmetric with respect to the second center line 120 and are parallel to the second center line 120.

The first electrode branches 1013 are symmetrically distributed in the touch electrode unit 100. Specifically, the first electrode branches 1013 are symmetrically distributed on both sides of the first longitudinal electrode stem 1011, that is, the first electrode branches 1013 are bilaterally symmetric with respect to the first center line 110, and are up-down symmetric with respect to the second center line 120.

As shown in FIG. 2, a part of the first electrode branches 1013 is connected to each other through the upper electrode stem 1011a and one of the first lateral electrode stems 1012, and the other part of the first electrode branches 1013 is connected to each other through the lower electrode stem 1011b and another one of the first lateral electrode stems 1012. It can be seen that the two parts of the first electrode branches 1013 are not directly connected to each other. That is, part of the first electrode branches and the other part of the first electrode branches are not directly connected to each other. In other words, the first electrode branches 1013 which are symmetric with respect to the second center line 120 are not directly connected to each other, but are indirectly connected through the upper and lower electrode stems and the first connection portion. That is, the second center line 120 divides all the first electrode branches 1013 into two parts, upper part and lower part.

In other words, the first electrode branches 1013 are connected to the first longitudinal electrode stem 1011 or the first lateral electrode stem 1012.

The first electrode branches 1013 connected to both sides of the first longitudinal electrode stem 1011 are symmetric with respect to the first center line 110, and the first electrode branches 1013 connected to the first lateral electrode stem 1012 are also bilaterally symmetric with respect to the first center line 110.

A plurality of first intermediate portions (reference numerals 140 and 130) are disposed between the first electrode branches 1013 and the first electrode stem 10, where reference numeral 130 is the first intermediate portion positioned between the first longitudinal electrode stem 1011 and the first electrode branches 1013, and the reference numeral 140 is the first intermediate portion positioned between the first lateral electrode stem 1012 and the first electrode branches 1013. A shape of the first intermediate portions is a right-angled triangle, and the hypotenuse of the right-angled triangle connects the first longitudinal electrode stem 1011 or the first lateral electrode stem 1012. The first electrode branches 1013 are perpendicular to the first intermediate portions 130 or 140, which are especially perpendicular to a right-angled edge of the first intermediate portion.

The second electrode stem 20 includes two second longitudinal electrode stems 1021 and a second lateral electrode stem 1022 positioned between the two second longitudinal electrode stems 1021.

The two second longitudinal electrode stems 1021 are vertically connected to the second lateral electrode stem 1022, and the second lateral electrode stem 1022 are disposed along the second center line 120 and are symmetric with respect to the first center line 110.

The second lateral electrode stem 1022 includes a left electrode stem 1022a, a right electrode stem 1022b, and a second connection portion 105. The second connection portion 105 connects the left electrode stem 1022a and the right electrode stem 1022b.

The left electrode stem 1022a and the right electrode stem 1022b are bilaterally symmetrical. Specifically, as shown in FIG. 1, the left electrode stem 1022a and the right electrode stem 1022b are symmetric with respect to the first center line 110.

The second electrode branches 1023 are symmetrically distributed in the touch electrode unit 100. Specifically, the second electrode branches 1023 are symmetrically distributed on both sides (upper and lower sides) of the second lateral electrode stem 1022, that is, the second electrode branches 1023 are up-down symmetric with respect to the second center line 110, and the second electrode branches 1023 are bilaterally symmetrical along the first center line 110.

As shown in FIG. 2, a part of the second electrode branches 1023 is connected to each other through the left electrode stem 1022a and one of the second longitudinal electrode stems 1021, and the other part of the second electrode branches 1023 is connected to each other through the right electrode stem 1022b and the other second lateral electrode stem 1022. The two parts of the second electrode branches 1023 are not directly connected to each other. That is, one part of the second electrode branches and the other part of the second electrode branches are not directly connected to each other. In other words, the second electrode branches 1023 that are symmetric with respect to the first center line 110 are not directly connected to each other, but are indirectly connected through the left and right electrode stems 1022a, 1022b, and the second connection portion 105. That is, the first center line 110 divides all the second electrode branches 1023 into left and right parts.

In other words, the second electrode branches 1023 are connected to the second longitudinal electrode stem 1021 or the second lateral electrode stem 1022.

A plurality of second intermediate portions (reference numerals 150 and 160) are disposed between the second electrode branches 1023 and the second electrode stem 20, where reference numeral 150 is the second intermediate portion positioned between the second lateral electrode stem 1022 and the second electrode branches 1023, and reference numeral 160 is the second intermediate portion positioned between the second longitudinal electrode stem 1021 and the first electrode branches 1023. A shape of the second intermediate portion is a right-angled triangle, and the hypotenuse of the right-angled triangle connects the second longitudinal electrode stem 1021 or the second lateral electrode stem 1022. The second electrode branches 1023 are perpendicular to the second intermediate portion 150 or 160, which are especially perpendicular to a right-angled edge of the second intermediate portion.

The first electrode branches 1013 are obliquely connected to the first electrode stem 10, and the second electrode branches 1023 are obliquely connected to the second electrode stem 20. An inclination angle of the first electrode branches 1013 is same as an inclination angle of the second electrode branches 1023, for example, both range from 0 degree to 90 degrees.

More specifically, a part of the first electrode branches 1013 is obliquely connected to the first lateral electrode stem 1012, and the other part of the first electrode branches 1013 is obliquely connected to the first longitudinal electrode stem 1011. Similarly, a part of the second electrode branches 1023 is obliquely connected to the second lateral electrode stem 1022, and the other part of the second electrode branches 1023 is obliquely connected to the second longitudinal electrode stem 1021. The inclination angles of the first electrode branches 1013 and the second electrode branches 1023 are same, for example, both range from 0 degrees to 90 degrees. It can be seen that the first electrode branches 1013 and the second electrode branches 1023 are parallel to each other.

The first electrode 101 and the second electrode 102 are insulated from each other. The first lateral electrode stem 1012 intersects with the second longitudinal electrode stem 1021 to form a crossing region, and each of the first electrodes 101 and each of the second electrodes 102 are insulated from each other in the crossing region. Each of the first electrode branches 1013 is arranged in a gap between two adjacent second electrode branches 1023.

Therefore, the above structural design can realize that the first electrode branches 1013 and the second electrode branches 1023 are coupled to each other, which can effectively improve the mutual capacitance value between the first electrode 101 and the second electrode 102, and at the same time, make the mutual capacitance electric field line distribution more uniform, which is more conducive to improve the resolution and accuracy of detecting the touch position.

In this way, through the optimum coupling between driving electrode (TX)/sensing electrode (RX), a coupling area of adjacent Tx/Rx junctions is enlarged to increase a mutual capacitance signal change amount $\Delta Cm$ when a touch is performed, thereby effectively improving the touch sensitivity.

Figure 3:
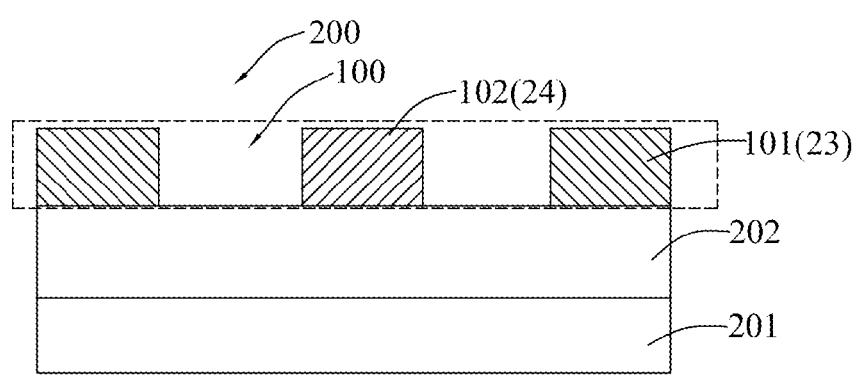
FIG. 3 is a schematic structural diagram of the touch electrode layer according to the present invention.

As shown in FIG. 3, the cross-sectional structure of the touch electrode layer 200 specifically includes a buffer layer 201, an insulating layer 202, a first metal layer 23, and a second metal layer 24.

The insulating layer 202 is disposed on the buffer layer 201. The first electrode chains 11 are formed in the first metal layer 23, and the second electrode chains 12 are formed in the second metal layer 24. In the present embodiment, the first metal layer 23 and the second metal layer 24 are disposed on a same layer.

Figure 4:
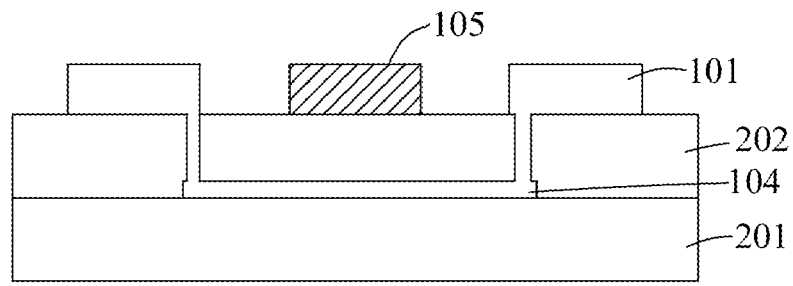
FIG. 4 is a cross-sectional view of the touch electrode layer along a direction of a first electrode stem in a crossing region according to the present invention.

As shown in FIG. 4, in the crossing region 150, the first connection portion 104 is a connection bridge, which is defined in the insulating layer 202 and is used to connect the first electrode 101. The second connection portion 105 and the second electrode 102 (as shown in FIG. 1) are disposed on a same layer, and the first connection portion 104 and the second connection portion 105 are both metal wires.

In other embodiments, the first metal layer and the second metal layer can be disposed in different layers, thereby preventing cross-connection in the crossing region. In the crossing region, the first electrode 101 and the second electrode 102 can be directly connected and no connection bridge is required. Specifically, the first metal layer is disposed in the insulating layer, and the second metal layer is disposed above the insulating layer.

In an embodiment, the present invention does not limit the number and structure of the connection bridges. It adopts a double bridge structure, and the two connection bridges are independent and are not connected to each other.

The first embodiment provides a single layer of touch electrode 200. The first electrode 101 and the second electrode 102 have the first electrode stem 10 and the second electrode stem 20, respectively. The first electrode branches and the second electrode branches are obliquely disposed along the first electrode stem 10 and the second electrode stem 20, respectively. The first electrodes 101 and the second electrodes are respectively symmetric with respect to the first center line and the second center line as the center axes, and the inclination angles of the electrode branches are same. In the touch electrode unit, the shape and size of the first electrode 101 and the second electrode 102 are almost same, and the shape and size of the electrode branches staggered adjacent to each other on the first electrode and the second electrode are also almost the same. This can effectively improve a mutual capacitance value between a touch driving electrode and a touch sensing electrode, as well as make the distribution of a mutual capacitance electric field in an entire touch screen structure more uniform, which is more conducive to improve resolution and accuracy of a touch position detection.

Second Embodiment

Figure 5:
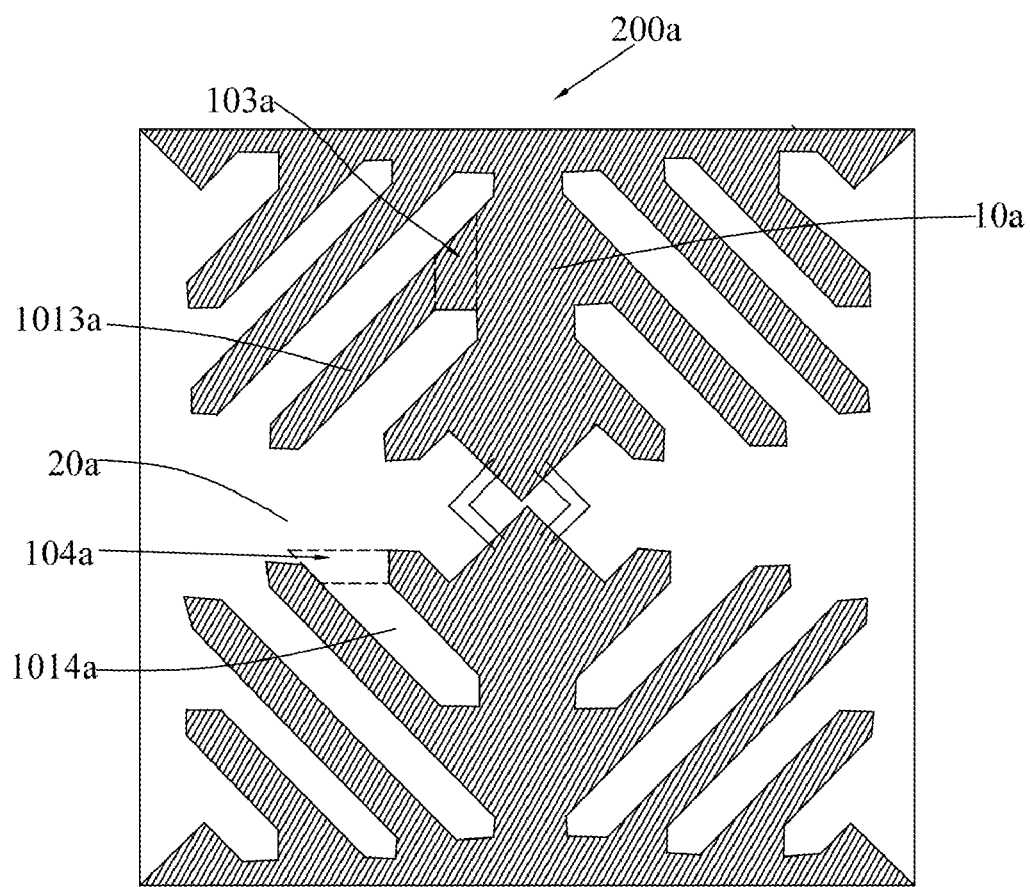
FIG. 5 is a schematic diagram of a planar layout of a touch electrode layer according to a second embodiment of the present invention.

Shown in FIG. 5 is the touch electrode layer 200*a* according to a second embodiment of the present invention. The difference between the second embodiment and the first embodiment is that the shape of the intermediate portion 130*a* positioned between the first electrode branches 1013*a* and the first electrode stem 10*a* is a right-angled trapezoid, and a height of the right-angled trapezoid is perpendicular to the first electrode stem 10*a*.

The shape of the second intermediate portion 140*a* positioned between the second electrode branches 1014*a* and the second electrode stem 20*a* is also a right-angled trapezoid, and the height of the right-angled trapezoid is perpendicular to the second electrode stem 20*a*.

Third Embodiment

Figure 6:
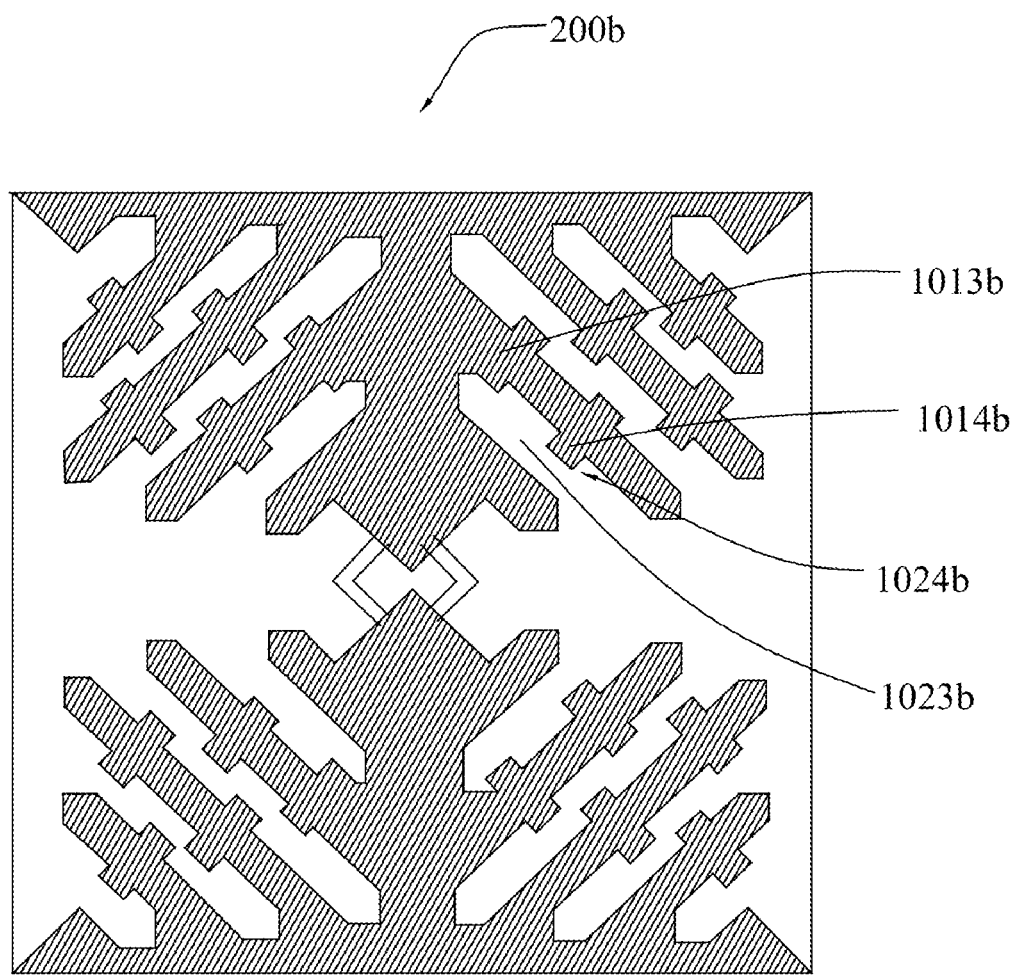
FIG. 6 is a schematic diagram of a planar layout of a touch electrode layer according to a third embodiment of the present invention.

Shown in FIG. 6 is the touch electrode layer 200*b* according to a third embodiment of the present invention. The difference between the third embodiment and the second embodiment is that each of the first electrode branches 1013*b* has at least one electrode protrusion 1014*b*, and the at least one electrode protrusion 1014*b* is perpendicular to the each of the first electrode branches 1013*b*. Each of the second electrode branches 1023*b* has at least one recess 1024*b*, and the at least one electrode protrusion 1014*b* is clamped in the at least one recess 1024*b*.

The electrode protrusion 1014*b* can further increase the coupling area of adjacent Tx/Rx junctions to increase the mutual capacitance signal change amount ΔCm when a touch is performed, thereby effectively improving touch sensitivity.

Fourth Embodiment

Figure 7:
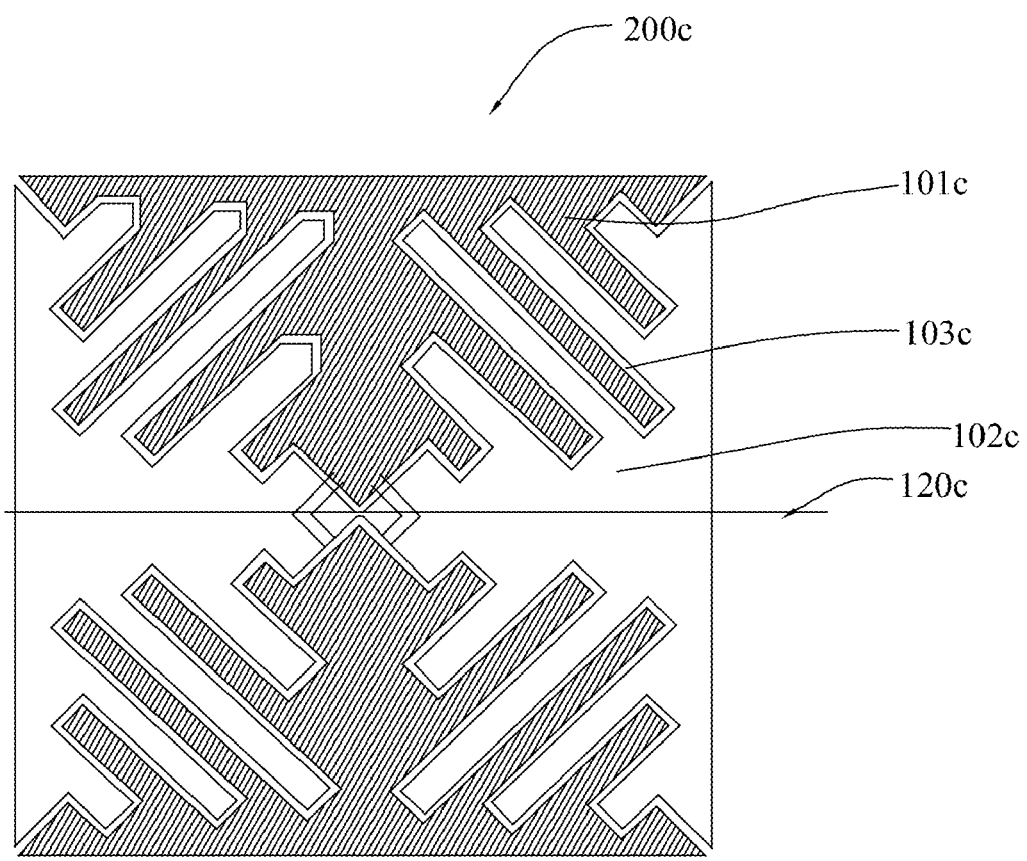
FIG. 7 is a schematic diagram of a planar layout of a touch electrode layer according to a fourth embodiment of the present invention.

Shown in FIG. 7 is the touch electrode layer 200*c* according to a fourth embodiment of the present invention. The fourth embodiment differs from the first embodiment in that a third electrode 103*c* is disposed between the first electrode 101*c* and the second electrode 102*c*. The third electrode 103*c* is up-down symmetric with respect to the second center line 120*c* and has disconnected upper and lower two parts. The third electrode 103*c* is electrically insulated from the first electrode and the second electrode and is not connected to each other. Moreover, a grid structure constituting the third electrode 103*c* surrounds at least one or more sub-pixels.

The fourth embodiment can effectively reduce the basic mutual capacitance value Cm, thereby improving the change rate of Cm when a touch is performed. The touch electrode unit according to the four embodiments of the present invention are not isolated, and different embodiments can be combined together to obtain better effects.

Figure 8:
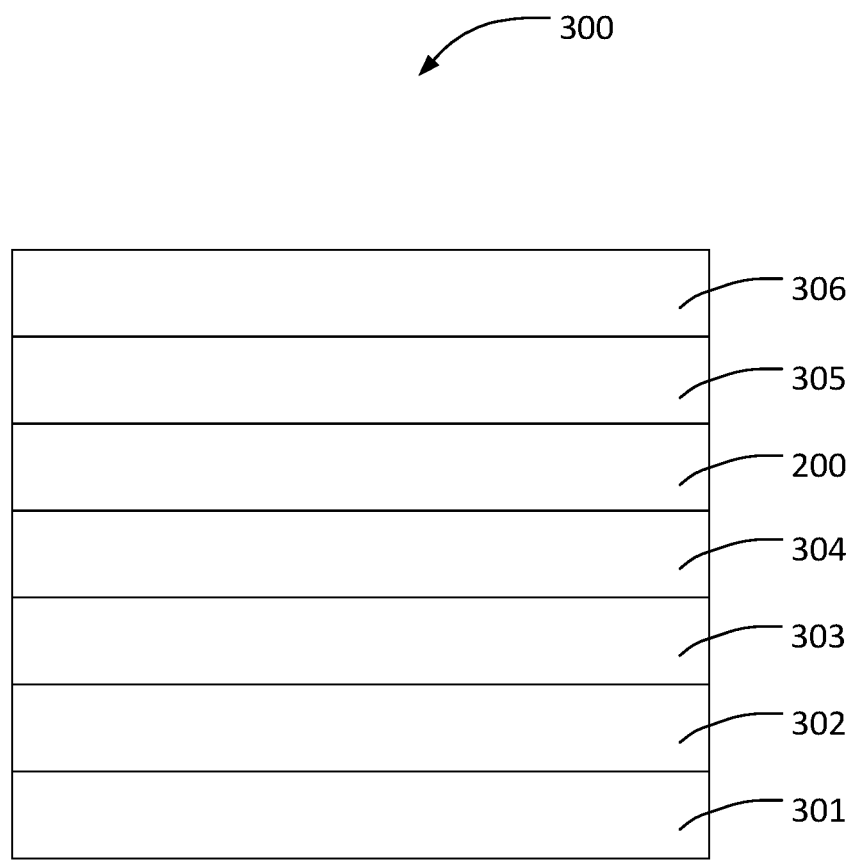
FIG. 8 is a schematic structural diagram of a touch display device according to the present invention.

As shown in FIG. 8, the present invention further provides a touch display device 300 including a substrate 301, a thin film transistor layer 302, a display layer 303, an encapsulation layer 304, the touch electrode layer 200, a polarizer 305, and a glass cover 306.

A thin film transistor is a low temperature polysilicon transistor, the thin film transistor layer 302 is disposed on the substrate 301, the display layer 303 is disposed on the thin film transistor layer 302, and the encapsulation layer 304 is disposed on the display layer 303.

The touch electrode layer 200 is disposed on the display layer 303, and the touch electrode layer 200 is connected to an integrated chip through a plurality of wires 203. The polarizer 305 is disposed on the touch electrode layer 200, and the glass cover 306 is disposed on the polarizer 305, and the glass cover 306 and the polarizer 305 are adhered to each other through an optical glue.

The glass cover 306 can be a transparent thin film, and the touch display device can be made into a folded display device.

A plurality of electrode grid lines of the touch electrode layer 200 are spaced from sub-pixels of the touch display device 300, and electrode wirings should be defined between the sub-pixels.

The embodiment of the present invention provides the touch display device 300 having the touch electrode layer 200. The touch electrode layer 200 has an array of touch electrode units 100. Each of the touch electrode units 100 has the first electrode 101 and the second electrode 102. The first electrode 101 and the second electrode 102 have the first electrode stem 10 and the second electrode stem 20, respectively. The first electrode branches and the second electrode branches are obliquely disposed along the first electrode stem 10 and the second electrode stem 20, respectively. The first electrodes 101 and the second electrodes are respectively symmetric with respect to the first center line and the second center line as the center axes, and the inclination angles of the electrode branches are same. In the touch electrode unit, the shape and size of the first electrode 101 and the second electrode 102 are almost same, the shape and size of the electrode branches staggered adjacent to each other on the first electrode and the second electrode are also almost the same. This can effectively improve the mutual capacitance value between the touch driving electrode and the touch sensing electrode, as well as make the distribution of the mutual capacitance electric field in an entire touch screen structure more uniform, which is more conducive to improve resolution and accuracy of a touch position detection.

Embodiments of the present application have been described, but not intending to impose any unduly constraint to the appended claims. For a person skilled in the art, any modification of equivalent structure or equivalent process made according to the disclosure and drawings of the present invention, or any application thereof, directly or indirectly, to other related fields of technique, is considered encompassed in the scope of protection defined by the claims of the present invention.

The technical scope of the present invention is not limited to the above description, a person skilled in the art can make various modifications and changes to the above embodiments without departing from the technical idea of the present invention, and such variations and modifications are intended to be within the scope of the invention.

What is claimed is:

1. A touch electrode layer, comprising:
   a plurality of first electrode chains disposed along a first direction, each of the first electrode chains comprising a plurality of first electrodes electrically connected to each other, a plurality of second electrode chains disposed along a second direction, each of the second electrode chains comprising a plurality of second electrodes electrically connected to each other, and each of the first electrode chains and each of the second electrode chains insulated from each other; and
   a third electrode insulated from the first electrodes and the second electrodes,
   wherein each of the first electrodes intersects with one of the second electrodes corresponding to the first electrode to form a touch electrode unit, each of the first electrodes comprises a first electrode stem and a plurality of first electrode branches, and each of the first electrode branches is obliquely connected to the first electrode stem;
   wherein each of the second electrodes comprises a second electrode stem and a plurality of second electrode branches, each of the second electrode branches is obliquely connected to the second electrode stem, each of the first electrode branches and each of the second electrode branches are staggered and insulated from each other, and each of the first electrode branches is arranged in a gap between two adjacent second electrode branches; and
   wherein the third electrode is disposed between the first electrode branches and the second electrode branches.

2. The touch electrode layer according to claim 1, wherein the first electrode stem comprises a first longitudinal electrode stem and two first lateral electrode stems respectively positioned at two ends of the first longitudinal electrode stem, the first longitudinal electrode stem is vertically connected to the two first lateral electrode stems, and the first electrode branches are all obliquely connected to the first longitudinal electrode stem or the first lateral electrode stems.

3. The touch electrode layer according to claim 2, wherein the second electrode stem comprises a second lateral electrode stem and two second longitudinal electrode stems respectively positioned at two ends of the second lateral electrode stem, the second lateral electrode stem is vertically connected to the two second longitudinal electrode stems, and the second electrode branches are all obliquely connected to the second longitudinal electrode stems or the second lateral electrode stem.

4. The touch electrode layer according to claim 3, wherein the first longitudinal electrode stem intersects with the second lateral electrode stem to form a crossing region, and each of the first electrodes and each of the second electrodes are insulated from each other in the crossing region.

5. The touch electrode layer according to claim 4, wherein the first longitudinal electrode stem comprises an upper electrode stem, a lower electrode stem, and a first connection portion connecting the upper electrode stem and the lower electrode stem;
   the upper electrode stem is up-down symmetrical with the lower electrode stem; and
   a part of the first electrode branches is connected to each other through the upper electrode stem and one of the first lateral electrode stems, and the other part of the first electrode branches is connected to each other through the lower electrode stem and another one of the first lateral electrode stems.

6. The touch electrode layer according to claim 1, wherein a plurality of first intermediate portions are disposed between the first electrode branches and the first electrode stem; and
   a plurality of second intermediate portions are disposed between the second electrode branches and the second electrode stem.

7. The touch electrode layer according to claim 6, wherein a shape of each of the first intermediate portions and the second intermediate portions comprises a triangle or a trapezoid.

8. The touch electrode layer according to claim 3, wherein the second lateral electrode stem comprises a left electrode stem, a right electrode stem, and a second connection portion connecting the left electrode stem and the right electrode stem;
   the left electrode stem is bilaterally symmetrical with the right electrode stem; and
   a part of the second electrode branches is connected to each other through the left electrode stem and one of the second longitudinal electrode stems, and the other part of the second electrode branches is connected to each other through the right electrode stem and the other second lateral electrode stem.

9. The touch electrode layer according to claim 1, further comprising
   a buffer layer;
   an insulating layer disposed on the buffer layer;
   a first metal layer disposed in the insulating layer, wherein the first electrode chains are formed in the first metal layer; and
   a second metal layer disposed on the insulating layer, wherein the second electrode chains are formed in the second metal layer.

10. The touch electrode layer according to claim 5, further comprising
    a buffer layer;
    an insulating layer disposed on the buffer layer and comprising a connection bridge corresponding to the crossing region;
    a first metal layer disposed on the insulating layer, wherein the first electrode chains are formed in the first metal layer; and a second metal layer disposed on the insulating layer and on a same layer as the first metal layer, wherein the second electrode chains are formed in the second metal layer, the first connection portion is the connection bridge in the crossing region, and the upper electrode stem and the lower electrode stem are electrically connected through the connection bridge.

11. The touch electrode layer according to claim 1, wherein the touch electrode unit comprises a first center line defined along the first direction and a second center line defined along the second direction;
the first electrode stem is bilaterally symmetric with respect to the first center line, and is up-down symmetric with respect to the second center line; and
the second electrode stem is bilaterally symmetric with respect to the first center line, and is up-down symmetric with respect to the second center line.

12. The touch electrode layer according to claim 1, wherein an inclination angle of the first electrode branches is same as an inclination angle of the second electrode branches.

13. The touch electrode layer according to claim 1, wherein a third electrode is disposed between the first electrode and the second electrode, the third electrode is up-down symmetrical and has disconnected upper and lower two parts, and the third electrode is insulated from the first electrode and the second electrode.

14. The touch electrode layer according to claim 1, wherein each of the first electrode branches comprises at least one electrode protrusion, the at least one electrode protrusion is perpendicular to the each of the first electrode branches; each of the second electrode branches comprises at least one recess, and the at least one electrode protrusion is clamped in the at least one recess.

15. A touch display device, comprising:
a substrate;
a thin film transistor layer disposed on the substrate;
a display layer disposed on the thin film transistor layer; and
the touch electrode layer according to claim 1.

16. The touch display device according to claim 15, wherein the first electrode stem comprises a first longitudinal electrode stem and two first lateral electrode stems respectively positioned at two ends of the first longitudinal electrode stem, the first longitudinal electrode stem is vertically connected to the two first lateral electrode stems, and the first electrode branches are all obliquely connected to the first longitudinal electrode stem or the first lateral electrode stems.

17. The touch display device according to claim 16, wherein the second electrode stem comprises a second lateral electrode stem and two second longitudinal electrode stems respectively positioned at two ends of the second lateral electrode stem, the second lateral electrode stem is vertically connected to the two second longitudinal electrode stems, and the second electrode branches are all obliquely connected to the second longitudinal electrode stems or the second lateral electrode stem; and
wherein the first longitudinal electrode stem intersects with the second lateral electrode stem to form a crossing region, and each of the first electrodes and each of the second electrodes are insulated from each other in the crossing region.

18. The touch display device according to claim 17, wherein the first longitudinal electrode stem comprises an upper electrode stem, a lower electrode stem, and a first connection portion connecting the upper electrode stem and the lower electrode stem;
the upper electrode stem is up-down symmetrical with the lower electrode stem; and
a part of the first electrode branches is connected to each other through the upper electrode stem and one of the first lateral electrode stems, and the other part of the first electrode branches is connected to each other through the lower electrode stem and another one of the first lateral electrode stems.

19. The touch display device according to claim 15, wherein a thin film encapsulation layer is further disposed between the display layer and the touch electrode layer.

* * * * *